(12) United States Patent
Dinh Sybeldon

(10) Patent No.: US 9,999,233 B1
(45) Date of Patent: Jun. 19, 2018

(54) LOW MOISTURE BARRIER FILM

(71) Applicant: Viskase Companies, Inc., Lombard, IL (US)

(72) Inventor: Ann Dinh Sybeldon, Woodridge, IL (US)

(73) Assignee: VISKASE COMPANIES, INC., Lombard, IL (US)

( * ) Notice: Subject to any disclaimer, the term of this patent is extended or adjusted under 35 U.S.C. 154(b) by 213 days.

(21) Appl. No.: 13/986,236

(22) Filed: Apr. 15, 2013

Related U.S. Application Data

(60) Provisional application No. 61/686,875, filed on Apr. 13, 2012.

(51) Int. Cl.
*A22C 13/00* (2006.01)

(52) U.S. Cl.
CPC .................................. *A22C 13/0013* (2013.01)

(58) Field of Classification Search
USPC ................................................ 428/35.7, 36.6
See application file for complete search history.

(56) References Cited

U.S. PATENT DOCUMENTS

| | | | |
|---|---|---|---|
| 2,424,346 A | 7/1947 | Wilcoxon | |
| 2,514,660 A | 7/1950 | McClure et al. | |
| 2,686,927 A | 8/1954 | Grey | |
| 2,757,409 A | 8/1956 | Parks et al. | |
| 2,901,358 A | 8/1959 | Underwood | |
| 3,106,471 A | 10/1963 | Firth | |
| 3,158,492 A | 11/1964 | Firth | |
| 3,307,956 A | 3/1967 | Chiu et al. | |
| 3,312,995 A | 4/1967 | Garey | |
| 3,442,663 A | 5/1969 | Turbak | |
| 3,456,044 A | 7/1969 | Pahlke | |
| 3,487,499 A | 1/1970 | Klyce | |
| 3,558,331 A | 1/1971 | Tarika | |
| 3,608,973 A | 9/1971 | Klyee | |
| 3,860,728 A * | 1/1975 | Tanner | C08H 1/06 426/105 |
| 4,250,211 A | 2/1981 | Damrau et al. | |
| 4,377,187 A | 3/1983 | Chiu | |
| 4,442,868 A | 4/1984 | Smith et al. | |
| 4,877,626 A | 10/1989 | Ande et al. | |
| 5,955,126 A | 9/1999 | Jon et al. | |
| 6,196,960 B1 | 3/2001 | Owensby | |
| 6,200,613 B1 | 3/2001 | Schafer et al. | |
| 6,296,960 B1 | 10/2001 | Faris et al. | |
| 7,310,926 B2 | 12/2007 | Nikoley et al. | |
| 7,392,642 B2 | 7/2008 | Topfer | |
| 7,544,118 B2 | 6/2009 | Mysker | |
| 7,718,207 B2 | 5/2010 | Krallmann et al. | |
| 7,964,229 B2 | 6/2011 | Lee et al. | |
| 8,110,259 B2 * | 2/2012 | Siegel et al. | 428/34.1 |
| 8,147,933 B2 | 4/2012 | Auf Der Heide et al. | |
| 2003/0054075 A1 | 3/2003 | Dinh-Sybeldon et al. | |
| 2004/0048083 A1 * | 3/2004 | Bamore et al. | 428/500 |
| 2005/0163948 A1 * | 7/2005 | McGarel | A22C 13/0013 428/34.8 |
| 2006/0057258 A1 | 3/2006 | Dinh-Sybeldon | |
| 2012/0003361 A1 * | 1/2012 | Yamaguchi et al. | 426/106 |

FOREIGN PATENT DOCUMENTS

| | | | | |
|---|---|---|---|---|
| EP | 1634501 A1 * | 3/2006 | | A22C 13/00 |
| JP | H2-69131 | 3/1990 | | |

* cited by examiner

*Primary Examiner* — James C Yager
*Assistant Examiner* — Kevin C Ortman, Jr.
(74) *Attorney, Agent, or Firm* — TraskBritt, P.C.; Donna Bobrowicz

(57) ABSTRACT

The present invention relates to a flat, multilayered, low moisture, barrier, laminated thermoplastic film with an absorptive food contact layer coated with a flavoring and/or coloring agent, which can be formed on automatic stuffing machinery into a sealed tube in a continuous manner for use as a food casing. This film has an absorptive food contact layer, an oxygen barrier layer, and a polyethylene outer layer. The coloring and/or flavoring agent on the absorptive layer is released onto the surface of encased foodstuff during cooking and processing.

26 Claims, No Drawings

LOW MOISTURE BARRIER FILM

CROSS-REFERENCE TO RELATED APPLICATION

This application claims the benefit of U.S. Provisional Patent Application Ser. No. 61/686,875, filed Apr. 13, 2012.

FIELD OF THE INVENTION

The present invention relates to a flat, multilayered, low moisture, barrier, laminated thermoplastic film with an absorptive food contact layer coated with a flavoring and/or coloring agent, which can be continuously formed on automatic stuffing machinery into a sealed tube for use as a food casing. This film has an absorptive food contact layer, an oxygen barrier layer, and a polyethylene outer layer. The coloring and/or flavoring agent found on the absorptive layer is released onto the surface of encased foodstuff during cooking and processing.

BACKGROUND OF THE INVENTION

Tubular films are used as sausage casings for processing and packaging sausages, including water or steam cooked sausages. They are also used to process and package various types of deli cuts of meats, such as those made from chicken, beef, and ham. One particularly typical film is made from regenerated cellulose, where viscose is extruded through an annular die into a coagulating and regenerating bath to produce a tube of regenerated cellulose, as is well-known in the art. This tube is subsequently washed, plasticized, e.g., with glycerin, and can be impregnated with a water-soluble, casing-permeable flavorant or colorant, and dried while inflated under substantial air pressure. After drying, this cellulose "nonfibrous" casing is wound on reels and subsequently pleated, or "shirred", on high speed shirring machines. Nonfibrous casings are typically used to process small diameter sausages including polish sausages, wieners, or frankfurters. This type of casing is generally removed from the sausages after processing.

Colorants and/or flavorants are introduced into the interior of the tubing during the manufacturing process, particularly by slugging or spraying. These additives are provided in the casing in order to color and/or flavor the foodstuff processed within. In particular, production of smoked or browned sausages or meats has been accomplished through the use of casings containing liquid smoke or caramel, which transfers to the surface of the encased meat product during processing.

Historically, colorants and flavorants have been applied to various foodstuffs, such as sausage and cheese surfaces, by various means. For example, sausages have been colored and/or flavored by smoking with gaseous or liquid wood smoke; by dipping peeled sausages into a vat containing a colorant; by spraying or dipping encased sausages with a casing-permeable liquid dye and/or flavorant; and by stuffing sausage meat into casings having their interior surfaces coated with a transferable colorant. Use of self-coloring cellulosic casings made with synthetic colorants was approved by the United States Department of Agriculture in 1947 and such casings have been commercially available since 1948. In different regions of the world and for various products, different colors range in popularity and some colorants may impart flavor as well as color.

Various patents disclose coloring or flavor compositions including compositions that contain annatto, norbixin, or bixin. U.S. Pat. No. 5,955,126 discloses the use of a bixin colorant composition wherein the bixin is contained in a water-soluble film-forming agent, and is applied as an internal colorant on shirred casings, providing a red color to sausages processed inside these casings. U.S. Pat. No. 4,877,626 (Ande et al.), which issued in 1989, discloses that a mixture of liquid smoke, caramel, and optionally bixin (or annatto) may be used to directly color and flavor raw meat prior to processing.

Another type of casing, fibrous casing, is made by folding a flat paper or textile so that the opposing side edges overlap, forming a tube, while extruded viscose is applied onto one or both sides of the tube. The viscose impregnates the supporting paper or textile tube and when the viscose coagulates and is regenerated, a fiber-reinforced tube of regenerated cellulose is produced. As with the nonfibrous casing above, flavorings and colorants can be introduced by slugging or spraying them into the interior of the tubing or onto the exterior of the casing. This fibrous casing is generally used in tubular casings having diameters of about 40 mm or more in order to provide dimensional stability, particularly during stuffing with meat emulsion, as in deli meats.

Production of both nonfibrous and fibrous casing is well-known in the art. Fibrous casing are also made with additional outer layers of various materials, such as plastics, to provide desired air and/or water barrier properties. One well-known way to provide barrier protection to the interior of the casing is through the application of liquid polyvinylidene chloride ("PVDC"), which upon drying hardens to a self-sustaining layer that can be removed from the fibrous casing. Examples of these types of casings are found in Chui, U.S. Pat. No. 4,377,187, Smith, U.S. Pat. No. 4,442,868, and Owensby, U.S. Pat. No. 6,296,960. A commercially available fibrous casing of this type is sold by Viskase Companies, Inc., of Darien, Ill., USA, under the name of "MP".

Another type of casing, thermoplastic casing, is made of multilayered laminated sheets of flat film, which are formed into a tube and sealed closed by various methods, such as by overlapping the ends of the tube and sealing them together using adhesives, or by applying a tape to the edges and sealing it with adhesives or by welding it over the seam with heat. Laminated films are produced by placing layers of various materials, such as nylons, polyethylenes, papers, ethylene vinyl acetates, and ethylene vinyl alcohols, to name a few, adjacent to each other, with or without the use of adhesives, in order to produce films with various desired properties. If the inner layer of the formed tube is an absorbent layer, such as a paper, colorants and/or flavorants can be introduced to this layer. Other such films are described in, for example, U.S. Pat. No. 6,200,613 and Japanese application H2-69131.

Multilayered thermoplastic films also can be made by extrusion lamination where the thermoplastic layer is extruded through a slot die directly onto the adhesive layer, or onto other plastic layers.

An important property of laminated film is that it must not delaminate upon handling or cooking, and in particular, when being peeled off of cooked product. It is extremely disadvantageous to have a layer of paper left on the skin of a cooked sausage as the product is considered unfit for consumption. Also, the film must maintain high strength and low elongation properties. It must be sealable, and the seal must withstand processing conditions. Additional features needed for films that provide flavor or color to the encased food include the ability of the film to absorb adequate amounts of flavoring or coloring material, such as liquid smoke or caramel, and then be able to transfer that material to the encased food product to deliver the specific taste or color. Properties, including water and oxygen barriers, are also desired in order to maintain water levels in the cooked product to minimize weight loss and to keep the product edible if stored with the casing or film left on.

The casings described above are usually provided to the food processor in a "shirred" form. Shirring is a method of pleating a long piece of flat casing into a much smaller tube, called a "stick". For examples, a shirred stick of nonfibrous, small-bored casing that measures about 24 inches in length can contain about 265 feet of casing. Another example is a one-meter long shirred stick of a multilayered laminated casing containing an absorbent inner surface that contains approximately 200 feet of flat casing. These sticks are placed on automatic stuffing machines whereby the sticks are held in place and the foodstuff, in particular sausage emulsions, are introduced under high speed and pressure into the interior of the stick, deshirring the stick and forming the sausages. Larger bore casings are used on machines that encase processed and formed meats, hams, or other whole muscle meats, as well as various deli-type meats. These casings are removed after cooking and the processed meats can be automatically sliced and packaged for sale to the ultimate consumer. Problems with the sticks that cause downtime in manufacturing operations include jamming in the automatic stuffing machines and/or the sticks breaking in the hopper that places the sticks into position on the machine to be stuffed. Also, because of the relatively short length of these deshirred sticks, it would be an improvement to be able to provide much longer lengths of casing to the manufacturer, thereby decreasing downtime of the stuffing machines as they continually replace used-up casing sticks.

Alternatively, flat film is used in automatic sausage manufacture. Currently there are machines available in the market that will take a flat piece of film, slide it over a horn or shoulder that curves the flat film, turns it into a tube, and seals together the two edges of the film with a sealing strip of thermoplastic film, forming a tubular casing. In particular, Poly-Clip System Corp. of Mundelein, Ill., USA, produces these sealing, clipping, and stuffing machines. Patents describing some of these machines can be found in U.S. Pat. No. 7,392,642, U.S. Pat. No. 7,310,926, and U.S. Pat. No. 7,544,118, which are all hereby incorporated by reference. Thermoplastic films such as those made of polyethylenes are particularly used on these machines. As these casings are made, they are stuffed with a meat emulsion, and the products are processed to completion.

The films available for this type of machinery must meet specific manufacturing requirements, including low moisture levels and the ability to withstand the high temperatures needed to weld-seal the casing. The primary benefit of this type of casing is the ability to produce many more sausages per length of film, reducing the downtown due to problems with shirred sticks. Some of these machines can handle 3,000 foot rolls of film before needing to have the film replenished.

Generally, films that contain a flavorant and/or colorant on their absorbent, interior surface have high moisture levels that range from greater than 30% by weight up to about 60% by weight. It is not possible to use these high moisture level-containing films on automatic sealing, clipping, and stuffing machines ("stuffing machines"), as the moisture content interferes with the traction of the film through the machine and causes the film to jam. These films are very tacky, with a high kinetic coefficient of friction, causing them to catch on the shoulder apparatus, preventing the formation of a tube from the flat film. What is needed in the industry is a low-moisture, flavor and/or color-containing, laminated flat film that can be provided in large quantities, thereby substantially increasing the number of foodstuffs that can be made on automatic stuffing machines as compared to those using casing sticks.

SUMMARY OF THE INVENTION

The present invention provides a solution to the above described problems of flavor and/or colorant-containing flat films needed for use on automatic sealing, clipping, and stuffing machines, to reduce downtime as compared to feeding individual casing sticks into machines that solely stuff casings, in highly automated sausage making plants. The invention is a low-moisture, multilayered, laminated flat film, containing a releasable flavorant and/or a colorant, which may be used on automated machines that continuously turn the flat film into tubular casing. This film has a kinetic coefficient of friction such that the outer layers of the film slide easily over the shoulder of the automatic stuffing machine when being formed into a tube. It also has sufficient tensile strength in both the machine and transverse directions to withstand handling conditions during the cooking and handling process. This casing, when stuffed with foodstuff, in particular sausage or whole meat emulsions, releases its flavorant and/or colorant onto the surface of the encased food during the processing of these foods, producing a flavored and/or colored final product.

Furthermore, the inventive film is a low-moisture, multilayered, laminated, flat film with at least five layers having the following structure: a first outer layer of an absorbent material, an adhesive layer, a layer of bioriented polyamide, an adhesive layer, and a second outer layer of polyethylene. This structure may also be shown as the following, from the first outer layer through the second outer layer: absorbent/adhesive/polyamide/adhesive/polyethylene. Once this film is formed into a tube, the absorbent layer becomes the innermost layer, with the polyethylene layer being the outermost layer.

A preferred embodiment of the present invention is a low-moisture, multilayered, laminated film with at least five layers comprising an absorbent paper layer, an adhesive layer, a layer of bioriented nylon 6, an adhesive layer, and a layer of polyethylene.

A particularly preferred embodiment of the present invention is a low-moisture, multilayered, laminated film having layers of an absorbent paper, an adhesive layer, a layer of bioriented nylon 6, an adhesive layer, and an outer layer of a polyethylene selected from the group consisting of low density polyethylene having a density from about 0.924 to about 0.925 g/cm$^3$, linear low density polyethylene having a density of about 0.916 g/cm$^3$, and a blend of low density and linear low density polyethylenes. Additional layers may be added to the inventive film to provide additional features to the film, such as increased oxygen or moisture barrier properties, or to add strength to the film.

Once the film is made, the paper layer of the film is coated with a solution of a peeling aid, liquid smoke, and/or caramel, or other flavorants or colorants, and mixtures of these flavorants and colorants. The coating may be applied to the inventive film in a number of well-known ways, such as by spraying, by applying it using a blade coating method, by a roll-coating method, or by rotogravure, or a printing method. In particular, the rotogravure method is preferred.

Once the coating is applied the film is dried to a finished moisture level of between from about 2.0% to about 5.0% by weight.

Kinetic coefficients of friction of plastic films are made when sliding over itself or over another substance. The coefficients of friction are related to the slip properties of plastic films. In the present invention, three kinetic coefficients of friction ("KCOF") are measured, and certain levels must be met. The desired KCOF of the absorptive layer containing the colorant and/or flavorant to the metal (of the turning shoulder of the stuffing machine) has a maximum of 0.400. The desired KCOF of the outer polyethylene layer to metal (important when the flat film is turned into a sleeve, or tube, and held under a metal collar of the stuffing machine), has a maximum of 0.425. The desired KCOF of the two outer layers to each other has a maximum of 0.425.

The inventive film is then automatically formed into a tube and sealed with a strip of laminate. One example of a sealing strip is that of a layer of polyethylene. A preferred sealing strip is made of the same component layers as is the film, except for the paper layer and its adjacent adhesive layer, being the polyethylene/adhesive/bioriented nylon 6 layers. The outer polyethylene layer of the sealing strip is the same polyethylene as is used in the film. This sealing strip is applied with its polyethylene side placed against the outer polyethylene layer of the formed tube, and welded with heat to create an abutted or overlapped seam. At this point, the casing may be automatically stuffed with food product and further processed.

DETAILED DESCRIPTION OF THE INVENTION

The inventive film is a multilayered, laminated, low-moisture, barrier film containing a flavoring and/or a coloring agent, with at least five layers having the following structure: a first outer layer being the absorbent layer (also called the "inner layer" when the flat film is turned into a tubular film), a second inner adhesive layer, a third inner thermoplastic layer being the oxygen barrier layer, a fourth inner adhesive layer, and a fifth outer thermoplastic layer being the moisture barrier and abuse-resistant layer (also called the "outer layer" of the resulting formed tube). It can be represented as follows: absorbent/adhesive/oxygen barrier/adhesive/moisture barrier. The absorbent layer of the inventive film is treated with an aqueous solution comprising colorant and/or flavorant and peeling aid, such as a liquid smoke solution, a caramel solution, or a blend of the two. Additional components of the solution can include polyethylene glycol, antifoaming agents, spot prevention agents, and sodium hydroxide, each ingredient providing properties as are all well-known in the art. Additional processing aids that a manufacturer may want to add to the solution may also be included. Once the film is treated with this solution, it is dried to a moisture level in the range of from about 2 to about 5 wt. %, substantially lower than currently available films with moisture levels of 30 to 60 wt. %. The film must also have KCOF values that confirm that the film will slide over the tube forming parts of the automatic stuffing machine.

The preferred use of the inventive flat film is on an automatic stuffing machine that continuously pulls the film forward and slides it over a horn or shoulder that curves the film, thereby turning it into a tube, and sealing together the two edges of the tube using a sealing strip and welding it to the outer layer of the tube, forming a sealed, tubular casing. One example of a sealing strip is that of a layer of polyethylene. A preferred sealing strip is made of the same component layers as is the film, except for the paper layer and its adjacent adhesive layer, being the polyethylene/adhesive/bioriented nylon 6 layers. The outer polyethylene layer of the sealing strip is the same polyethylene as is used in the film. This sealing strip is applied with its polyethylene side placed against the outer polyethylene layer of the formed tube, and welded with heat. The sealed edges may be abutted or slightly overlapped, depending on various factors, such as the film slipping slightly while being formed into a tube. The amount of tubular casing that can be continuously formed is substantially greater in length than previously known shirred sticks of casing. The formed casing then is almost immediately stuffed with foodstuffs on these automated machines and the finished products are further cooked and processed. Downtime of the automated machines is substantially reduced on the manufacturing floor, as compared to the when shirred sticks of casing are used, thereby reducing the manufacturers cost of producing the final products. Currently, 3,000 foot rolls of the inventive film can be made and supplied to the ultimate customer, as compared to comparable shined sticks having total lengths of less than 200 feet. The length of the rolls of flat film can be adjusted to the amount preferred by the casing customer, based on the capabilities of the particular machinery being used. In comparison, the much shorter shirred sticks must be changed many times to provide the same amount of casing as one roll of flat film. Once the food product is made, it is then further processed by cooking. During the cooking cycle, the flavorant and/or colorant on the absorbent inner layer transfers from the inner layer of the casing to the outer surface of the cooked product, delivering the desired flavoring and/or coloring to it.

Although the inventive film is described as having five layers, more layers may be added if desired or fewer layers may be used. For example, if different moisture or oxygen barrier properties are desired, additional interior layers may be added to the laminate, in a manner that is well known to those skilled in the art. In one example of this, it is known that the oxygen barrier layer can comprise any suitable material, such as the preferred nylon of this invention, or it may be ethylene vinyl alcohol ("EVOH") or a polyvinylidene chloride, and is preferably positioned between the first, absorbent layer and the outermost polyethylene layer, possibly adjacent to the current polyamide amide, with or without an additional adhesive layer. Another example is that of a second moisture barrier layer adjacent to the outer polyethylene layer. Alternatively, the thermoplastic layers may be placed next to each other while still hot, allowing the layers to "melt" or bond with each other, as well as the nylon layer directly bonding with the absorptive layer. In this case, one or both of the adhesive layers are not necessary to the inventive film. A multilayered thermoplastic film comprising a first outer absorbent layer, a second inner thermoplastic layer, and a third outer thermoplastic layer; wherein said second inner thermoplastic layer comprises an oxygen barrier; and said third outer thermoplastic layer comprises a moisture barrier and abuse-resistant layer is also an example of the inventive film with less than five layers.

A preferred embodiment of the present inventive film consists of the following layers: first outer layer of an absorbent paper; a second inner layer of adhesive; the third inner thermoplastic layer of bioriented nylon 6, a fourth inner layer of an adhesive, and a fifth outer layer of polyethylene, this being the second outer layer of the film. The film layers may be represented as: absorbent/adhesive/nylon 6/adhesive/polyethylene. Variations of the order of the layers may be made as known to those skilled in the art, but once formed into a tubular casing, the absorbent layer must be the interior layer that is adjacent to the foodstuff and the polyethylene layer must be the outer layer, for its barrier, abuse-resistance, and melt properties.

The first outer absorbent paper layer may be made from any absorptive paper or fabric, for example, nonwoven cellulosic paper; PET papers made of mixtures of cellulose and polyethylene terephthalate ("PET") or other polyesters ("PET papers"); papers containing fibers or made exclusively of noncellulosic materials, such as cotton, flax, and bamboo; pressed, matted, or felted papers; woven or nonwoven fabrics; or any variant of an absorptive material that has enough substance to be formed into a sheet, bonded to the adjacent layer of the film, and does not delaminate when removed from the cooked foodstuff. Particularly preferred is the nonwoven PET paper because excellent adhesion to the polyamide layer is obtained using very low amounts of adhesive. As with the nonwoven cellulose PET paper, the best adhesion is obtained by using a cellulose paper having anchoring fibers intertwined to act as high adhesion points. Papers containing other polyesters or other types of polymers are also expected to function well in this regard. This first outer absorbent layer must be able to absorb sufficient quantities of flavorant and/or colorant solution so that after processing the encased foodstuff, the absorbed flavorant and/or colorant is transferred to the surface of the encased sausage or foodstuff in a desired amount.

The second layer is an adhesive or "tie" layer. Various adhesives are well-known in the art and can be used to adhere the inner absorbent layer to the polyamide layer. In particular, it has been found that a polyurethane-based adhesive is a preferred adhesive, as the absorbent layer does not easily delaminate from the nylon layer after the food is processed, insuring that all absorbent paper is removed from the surface of the processed foodstuff. Other adhesives may be used in this adhesive layer, as are well-known in the art.

The third layer is preferred to be a bioriented polyamide, and particularly bioriented nylon 6. Polyamides are well-known in the art as film layers. Polyamides and co-polyamides, such as nylon 6,66, are useful for providing both a measure of strength and for oxygen barrier properties to the film. Polyamides are polymers having recurring amide (—CONH—) linking units in the molecular chain. They include nylon resins which are well known polymers having a multitude of uses including utility as packaging films, bags and casing. "Nylon" is a generic term for synthetic, high molecular weight (MW 10,000) linear polyamides. Suitable nylons are commercially available and may be prepared by well known methods including addition or self-condensation reactions, e.g., of amino acids or lactams and condensation reactions of diamines with diacids. Nylon polymers may be aliphatic or aromatic. Suitable nylon polymers may be homopolymers or copolymers such as bipolymers and terpolymers, and blends and modifications thereof. Suitable nylons for use in the present inventive film are believed to include nylon 6, nylon 6/12 copolymer, and nylon 6/66 copolymer. The especially preferred polyamides are aliphatic nylons such as nylon 6. Nylon films may be biaxially stretched, producing bioriented (in both the machine and transverse direction of the film) films.

The fourth layer is an adhesive tie layer between the nylon layer and the polyethylene layer and may be the same or different from the second tie layer adhesive. It may also be any other adhesive well-known to those skilled in the art of producing laminated films.

The fifth and second outer layer is both an abuse-resistant layer and a moisture barrier layer. Abuse-resistant layers are needed to withstand contact with sharp objects and provide abrasion resistance. In the present invention, this abuse-resistant layer is also the heat sealable layer. As an exterior surface layer of the film, this is the outermost layer of the ultimate tubular film and is therefore subject to handling and abuse e.g. from equipment during packaging, and from rubbing against other surfaces during the production of cooked food products. This contact causes abrasive forces, stresses and pressures which may abrade away the film causing punctures or breaches in the integrity of the package, causing loss of food product, due to contamination. Therefore, the exterior surface layer is typically made from materials chosen to be resistant to abrasive and puncture forces and other stresses and abuse which the packaging may encounter during use. Generally, the exterior surface layer should be easy to machine (i.e. be easy to feed through and be manipulated by machines when being formed into tubular casings and stuffed with food emulsions). Suitable stiffness, flexibility, flex crack resistance, modulus, tensile strength, coefficient of friction, printability, and optical properties are also frequently designed into exterior layers by suitable choice of materials. This preferred layer of polyethylene was chosen because it has characteristics suitable for creating desired heat seals using overlap seals or having the seal welded with a sealing strip.

People skilled in the art generally refer to several broad categories of polymers and copolymers as "polyethylene." Placement of a particular polymer into one of these categories of "polyethylene" is frequently based upon the density of the "polyethylene" and often by additional reference to the process by which it was made since the process often determines the degree of branching, crystallinity, and density. In general, the nomenclature used is nonspecific to a compound but refers instead to a range of compositions. This range often includes both homopolymers and copolymers. For example, "high density" polyethylene ("HDPE") is ordinarily used in the art to refer to both (a) homopolymers of densities between about 0.960 to 0.970 g/cm$^3$ and (b) copolymers of ethylene and an α-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chain has some branching, are "ultra high molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with α-olefins and the term will be used without regard to the presence or absence of substituent branch groups.

Another broad grouping of polyethylene is "high pressure, low density polyethylene" ("LDPE"). The polyethylene industry began in the 1930's as a result of the discovery of a commercial process for producing LDPE by Imperial Chemical Industries, Ltd. researchers. LDPE is used to denominate branched homopolymers having densities between 0.915 and 0.930 g/cm$^3$ as well as copolymers containing polar groups resulting from copolymerization e.g. with vinyl acetate or ethyl acrylate. LDPEs typically contain long branches off the main chain (often termed "backbone") with alkyl substituents of 2 to 8 carbon atoms.

In the 1970's a new grouping of polyethylene was commercialized-linear low density polyethylene ("LLDPE").

Only copolymers of ethylene with α-olefins are in this group. LLDPEs are presently recognized by those skilled in the art as having densities from 0.915 to 0.940 g/cm³. The α-olefin utilized is usually 1-butene, 1-hexene, or 1-octene and Ziegler-type catalysts are usually employed (although Phillips catalysts are also used to produce LLDPE having densities at the higher end of the range).

In the preferred embodiment, the fifth layer (the second outer layer) is made of polyethylene, selected from the group consisting of LDPE, LLDPE, and a blend of LDPE and LLDPE. The particularly preferred polyethylene is selected from the group consisting of LDPE having a density from about 0.924 to about 0.925 g/cm³, LLDPE having a density of about 0.916 g/cm³, and a blend of LDPE and LLDPE.

Color concentrates can be added to the polyamide or polyethylene layers, thereby producing colored casing. Colored casing is preferred by certain manufacturers for a number of reasons, such as for identification purposes or to more easily spot any bits of casing that haven't peeled off of the final processed foodstuff.

Film of the present invention may be made by slot cast extrusion, or by lamination with orientation, e.g. by tentering. One way of making the inventive film is by using a method for biaxially orienting the nylon layer in which a primary tube is formed by melt extruding a tube from an annular die. The primary tube can be made by any of the known techniques for extrusion of tubular plastic film including extrusion and coating lamination methods. This extruded tube is cooled, collapsed, and then inflated between first and second means for blocking the interior of the tube which means are set apart from one another to form an isolated fluidic mass or bubble, and the inflated tube is advanced through a heating zone to bring the tube to its draw temperature. In a draw or orientation zone the tubing is radially expanded in the transverse direction and pulled or stretched in the machine direction at a temperature such that expansion occurs in both directions (preferably simultaneously)—the expansion of the tubing being accompanied by a sharp, sudden reduction of thickness at the draw point. The term "heating zone" is used to define a region which includes both a zone of preliminary heating of the primary tubing to the draw temperature and also the draw or orientation zone. Once made, the extruded tube is slit to form a flat film, that can then be attached to the absorbent and polyethylene layers with adhesive.

In a preferred extrusion double bubble process of the type described in U.S. Pat. No. 3,456,044, the nylon tube leaving the die is inflated by admission of air, cooled, collapsed, and then preferably oriented by reinflating to form a secondary bubble with reheating to the film's orientation (draw) temperature range. Machine direction ("MD") orientation is produced by pulling or drawing the film tube e.g. by utilizing a pair of rollers travelling at different speeds and transverse direction ("TD") orientation is obtained by radial bubble expansion. The oriented film is set by rapid cooling. Suitable MD and TD stretch ratios are from about 3:1 to about 5:1 with a ratio of about 4:1 preferred. As above, the resulting tube is slit and laminated to the absorbent layer with the use of the tie layer. The polyethylene layer can be made by slot cast extrusion or by the conventional blown film method as is well-known in the art. The flat die or slot cast process includes extruding polymer streams through a flat or slot die onto a chilled roll and subsequently winding the film onto a core to form a roll of film for further processing. In the present case, polyethylene is melt extruded through the slot die, ultimately producing a flat sheet of film. This film may be then adhered to the nylon layer with adhesive. Coextrusion of the polyethylene layer and the adhesive layer may also be done with this method, and in this case, the final coextruded film would be adhered to the nylon layer of the film.

The tie layers are not necessary if, for example, the flat extruded polyethylene layer is placed directly next to the nylon layer and the hot polyethylene adheres to the nylon layer, and they adhere to each other.

Once the layers have been laminated together, a flavoring and/or coloring solution is applied to the absorptive layer. This solution is the coloring and/or flavoring agent, such as liquid smoke or caramel, water, and a peeling agent.

It is known in the art that ease of peeling of the casing, particularly for skinless frankfurters, is directly related to skin formation and production of a liquid layer or coating between the casing and the "skin" of the sausage. Under some conditions, peeling the casing from the processed sausage has presented problems, particularly in the production of so called "skinless" frankfurters where large numbers of the product are involved and especially in commercial operations using high-speed automatic stuffing and peeling machines. When the casing is removed from the meat mass by automatic high-speed peeling machines, there is occasionally a tendency for some meat to adhere to the casing and be torn from the sausage with the casing, thereby causing surface marring of the sausage. In other instances, variations in the meat emulsion formulations or in the processing conditions can result in a degree of adherence of the casing to the product which hinders rapid removal of the casing from product encased therein. The use of high-speed, automatic peeling machines in commercial operations, for example, as disclosed in U.S. Pat. Nos. 2,424,346, 2,514,660, 2,686,927, 2,757,409, 3,312,995, 3,487,499, and 3,608,973, makes it particularly essential that there be minimal resistance to the separation of casing from sausage, or the product will jam at the peeler or go through unpeeled. Less than complete removal of the casing necessitates the expense and inconvenience of hand sorting and peeling. This also applies to the situation when larger-sized meat products are made. Adhesion of the casing to the processed meat product results in defective products, from the manufacturers viewpoint, and increases the cost of production due to excess waste.

Many attempts have been made to provide casings having easy release characteristics. It is known in the art, as disclosed, for example, in U.S. Pat. Nos. 2,901,358, 3,106,471, 3,158,492, 3,307,956, 3,442,663, and 3,558,331, that the application of certain types of coatings to the inside wall of food casings may afford improvement in the release characteristics of the casing from the encased sausage product. Use of peeling aids or release coatings have helped to overcome these peelability problems. Following cooking, cooling, and hydrating, water-soluble cellulose ether containing peeling aids help release the casing from the frankfurter skin by formation of a slippery layer between the casing and the frankfurter skin. Peeling aids are well-known in the art and include, but are not limited to, substances such as carboxymethyl cellulose, hydroxypropyl cellulose, lecithin, and various waxes including paraffins, beeswaxes, and natural waxes.

Typical water-soluble cellulose ethers which may be employed are the nonionic water-soluble alkyl and hydroxyalkyl cellulose ethers such as, methylcellulose, hydroxypropyl methylcellulose, hydroxypropylcellulose, ethyl methylcellulose, hydroxyethylcellulose and ethyl hydroxyethylcellulose and preferably the anionic water-soluble cellulose ethers such as, carboxymethylcellulose and carboxymethyl hydroxyethylcellulose. Mixtures of nonionic and anionic water-soluble cellulose ethers may also be employed. Commercially, carboxymethylcellulose ("CMC") and carboxymethylhydroxyethylcellulose are almost always sold as the sodium salt, and it is well established trade practice not to refer to the commercial product as the sodium salt. For the purpose of this application, reference to these anionic materials shall include salts thereof, e.g., the sodium salt and other alkali metal salts thereof.

The amount of water-soluble cellulose ether, and the other possible peeling aids, present on the internal surface of food casings can vary over a wide range, although very small quantities are actually required. In comparison, for the present invention, natural peeling aids, such as waxes, may be used in concentrations ranging from about 1.0 wt. % to about 13.0 wt. % of the final coloring and/or flavoring solution, with a preferred amount being in the range of about 3.0 wt. % to about 13 wt. %. As with all peeling aids, the amounts of these types of peeling aids used in the coloring and/or flavoring solutions will depend on the type of food emulsions or formulations and processing conditions encountered.

One coloring solution that imparts a level of brown color to the final processed product and that may be applied to the inner absorptive layer is an aqueous caramel solution of water, caramel, and a peeling aid. A general formula of the caramel solution is from about 15.0 wt. % to about 80.0 wt. % of caramel; from about 2.0 wt. % to about 5.0 wt. % of surfactant; from about 10.0 wt. % to about 40.0 wt. % of propylene glycol; and from about 3.0 wt. % to about 20.0 wt. % of a peeling aid, the solution having a final pH in the range of from about pH 2 to about pH 10. The ultimate formula will depend on the type of caramel used and the desired color of the final product.

A flavoring agent used in the meat industry is liquid smoke, which can also be considered a coloring agent, depending on the type of liquid smoke used. Liquid smoke is also used to give a smoky flavor to the encased meat. Both tar containing and tar depleted liquid smokes may be used on the inventive film. The liquid smoke solution of the present invention comprises an aqueous solution of a peeling aid and liquid smoke. The pH range of liquid smoke solution is in the range of from about 4 to about 14. A liquid smoke solution that is more acidic will be tacky and will jam in the automatic Poly-Clip-type sealing, clipping, and stuffing machine, preventing the tubing from being formed. A particularly preferred pH range of the liquid smoke solution is from about 5 to about 6. Additional components of the solution may include propylene glycol, 25% sodium hydroxide to adjust the pH of the solution, and an antifoaming agent.

A liquid smoke solution of the present invention consists of from about 4.5 to about 70.0 wt. % water; from about 4.0 to about 35.0 wt % propylene glycol; from about 1.0 to about 15.0 wt. % of 25% sodium hydroxide as needed to adjust the pH of the solution; liquid smoke from about 60.0 to about 80.0 wt. %, and peeling aid from about 3.0 to about 20.0 wt. %, and about 1.0 wt. % of antifoam.

A preferred liquid smoke solution consists of from about 4.5 to about 15.0 wt. % of water; from about 4.0 to about 12.0 wt % of propylene glycol; from about 1.0 to about 10.0 wt. % of 25% sodium hydroxide; from about 60.0 to about 71.0 wt. % of liquid smoke; from about 5.0 to about 20.0 wt. % of a peeling aid; and about 1.0 wt. % of an antifoam agent.

A particularly preferred liquid smoke solution contains from about 5.0 to about 8.0 wt. % of water; from about 4.0 to about 8.0 wt. % propylene glycol; about 1.0 wt. % of 25% sodium hydroxide; from about 60.0 to about 80.0 wt. % of liquid smoke; from about 10.0 to about 20.0 wt. % of a peeling aid; and about 1.0 wt. % of an antifoam agent, the solution having a pH of from about 4 to about 6.

These solutions may be applied to the absorbent layer of the laminated film in any number of ways. The solution may be sprayed onto the absorbent layer. It may be applied by the blade coating method, a method where a coating solution is applied to a paper that is usually supported and carried by a resilient backing roll, using a flexible doctor blade located some distance from and on the trailing side of the applicator, which serves to level the applied coating. In general, an excess of coating material is applied to the paper web, and the trailing blade then meters or removes the excess while uniformly spreading the coating onto the paper's surface (See U.S. Pat. No. 4,250,211, "Paper coating method and apparatus," to Wayne A. Damrau et al., issued on Feb. 10, 1981.) Another method for applying the solution to the inventive film is the rotogravure method, wherein an engraved cylinder is coated with the solution, and from the cylinder it is transferred to the absorbent layer of the inventive film. This is an old printing method still in use and well-known to those in the printing arts. Roll coating and other printing methods may also be used to deposit the coloring and/or flavoring solutions onto the absorbent layer of the film.

Once any flavoring and/or coloring solution is applied to the absorbent layer, the coated film is dried to a finished moisture level of from about 2.0 to about 5.0 wt. % moisture. It has been found that if the moisture level falls below about 2.0 wt. %, the film becomes brittle and unusable, and if the moisture level is greater than about 5.0 wt. %, the film become too tacky and jams the automatic stuffing machine. Additionally, if the moisture level of the film is greater than about 5.0 wt. %, the adhesive of the second layer, between the adhesive layer and the polyamide layer, doesn't adhere properly, allowing the film to delaminate upon use.

Kinetic coefficients of friction of plastic films are measured when the film slides over itself or over another substance. The coefficients of friction are related to the slip properties of plastic films. In the present invention, three kinetic coefficients of friction ("KCOF") are measured, and certain levels must be met. The desired KCOF of the absorptive layer containing the colorant and/or flavorant to the metal (of the turning shoulder of the stuffing machine) has a maximum of 0.400. The desired KCOF of the outer polyethylene layer to metal (important when the flat film is turned into a sleeve, or tube, and held under a metal collar of the stuffing machine), has a maximum of 0.425. The desired KCOF of the two outer layers to each other has a maximum of 0.425.

Furthermore, other than on the automatic stuffing machinery as described above, the inventive film may also be made into tubes by seaming the edges of the film together, either abutting or by overlapping the edges and using, e.g., adhesives to seal the edges or by welding the seam closed by the use of a strip of film made of the same polyamide, adhesive, and polyethylene as is used in the inventive film. In this case, the polyethylene of the strip is placed adjacent to the formed tube and welded in place with heat or other melting means. In this manner, various diameter tubes may be made from the flat, sheet film without the need of an automatic stuffing machine.

The following test methods are referred to in this application and examples.

Experimental results of the following examples are based on tests similar to the following test methods unless noted otherwise:

KCOF is measured on Kayeness D1055 equipment using the ASTM D1894 test method.

Moisture analysis is done using the Mettler Toledo Halogen moisture analyzer model HR73 and method, which is obtainable on the Mettler Toledo website.

L, a, b Test: Hunter L, a, b values are standard color scale values which indicate differences in brightness, hue and saturation using a standard color system which relates lightness as L values, and hue and croma as a combination of a and b values on a coordinate scale where a represents redness-greenness and b represents yellowness-blueness. L values describe the degree of darkness, where a value of 100 equals white and that of 0 equals black. a-values describe the degree of redness, which increases with an increasing a-value. b-values describe the degree of yellowness, which increases with increasing b-value. Hunter L, a, b and color scale values and opacity may be measured by the following tests.

Encased or peeled sausages or meat stuffs may be tested as is. L, a, b values and opacity are measured using a colorimeter such as a hand held model colorimeter available from Hunter Associate Laboratory, Inc. of Reston, Va., U.S.A. or the Color Machine Model 8900 available from Pacific Scientific.

Example 1. Preparation of Inventive Film and Meat Processing Steps

Approximately 5900 feet of the inventive flat film was used in this experiment. The film was a flat laminate structure with the layers being (as read from the ultimate outside layer to the ultimate inner layer when formed into a tube) LLDPE/polyurethane adhesive/bioriented nylon 6/polyurethane adhesive/non-woven cellulose-PET paper.

The film was wound tightly on a roll and placed on a rotogravure applicator. A liquid smoke solution was prepared and applied to the paper layer by the gravure applicator. The solution compositions used are given in Example 2. The application speed for the liquid smoke solutions of Example 2 was 20 meters/minute. The film was dried in an oven having a temperature of from 250 to 275° F., without the use of infrared heating. The resulting film had a finished moisture level of 3+/−1 wt. %. The KCOF of the liquid smoke-containing absorbent layer to metal was 0.400 Maximum, the KCOF of the polyethylene layer to metal was 0.425 Maximum, and the KCOF of the liquid smoke-containing absorbent layer to the polyethylene layer was 0.425 Maximum. These values indicated that the smoked film would track smoothly on the Poly-Clip TSC A-200 machine, an automated machine that used the inventive flat film to automatically form and weld-seal tubular casing, and stuff it with meat emulsion thereby forming "chubs" of meat product, such as deli meats, and clips shut both the leading and tail ends of the chubs of meat.

The food casing was made from the film automatically on the Poly-Clip TSC A-200 machine by pulling the flat film over a forming shoulder, forming it into a tube with slightly overlapping edges that were heat sealed together with a sealing strip. The sealing strip was of the same composition of the laminated film, except that it was only a 3-ply film—LLDPE/urethane adhesive/polyamide 6. This sealing strip was applied with the LLDPE side adjacent to the outside seam of the formed tube, the LLDPE layer, and it was heat welded to create an overlapped seam. This formed casing was then automatically stuffed with meat emulsion in a continuous process forming "chubs" of product, using all 5900 feet of flat inventive film.

Once the chubs were made, they were cooked and processed, and ultimately, the inventive casing was removed from the chubs, which were then inspected for delamination of the film and for color transference.

Example 2. Delamination and Color Transfer #1

The film of Experiment 1 was made, applying the liquid smoke solutions to the absorbent layer of the inventive flat film which are given as follows:

TABLE 1

Liquid Smoke Solutions and Meat Emulsions Used.

|  | U (wt. %) | W (wt. %) | Y (wt. %) | Z (wt. %) |
|---|---|---|---|---|
| Water | 6.77 | 6.55 | 5.60 | 13.46 |
| Polyethylene glycol | 10.67 | 10.32 | 8.84 | 8.40 |
| 25% NaOH | 12.43 | 12.02 | 10.31 | 1.90 |
| Liquid Smoke | 68.82 | 66.82 | — | — |
| Mesquite liquid smoke | — | — | 75.00 | 75.00 |
| Peeling aid | — | 1.00 | — | 1.0 |
| Antifoam | 1.00 | 3.00 | — | — |
| pH of Solution | 5.04 | 5.04 | 4.98 | 4.98 |
| Meat emulsion | ham | ham | turkey | turkey |

Two different types of liquid smoke were used, one a standard smoke and the other a mesquite smoke, each being in the desired p H range. Peeling aid was only present in samples W and Z, and antifoam only in samples U and W.

Each of these flat films was processed on the same machine as described in Ex. 1, and ultimately stuffed with either turkey or ham emulsion, as given in the table above. The final meat chubs were processed in standard cooking and processing cycles. The casing was then removed and the meat chubs checked for color and inspected for casing remaining on their surfaces (i.e., delamination).

Delamination:

Over 60 chubs of Samples Y and Z were tested. Samples Z with 1 wt. % of peeling aid performed better than did the samples Y that had no peeling aid, but there were problems with peeling and delamination in both sample sets. Complete peeling of the casing off of the chubs was seen in 4 out of 16 chubs of Sample Z. The remainder of the chubs had some residual casing left on them after peeling. Two others of these 16 chubs exhibited delaminated film.

Samples U and W were cooked and processed in standard processing cycles. A total of six samples were processed, five of Sample U and one of Sample W (with processing aid). In three of five Sample U chubs, 100% of the casing peeled off the foodstuff, while the remainders had some problems with peeling. Sample U had film delamination. The peeling aid-containing samples were more likely to have complete peeling. Higher levels of peeling aid in the applied solutions are believed to increase the ease of removing the casing from the processed food.

Color Transfer.

The Samples U, W, X, and Z were tested for color transference from the casing to the processed food. Testing was done using the L, a, b test as described above.

TABLE 2

Color L, a, b Values

| Samples (meat) | L | a | b |
|---|---|---|---|
| U (ham) | 54.98-56.24 | 12.50-13.64 | 20.92-23.20 |
| W (ham) | 53.73-55.18 | 13.66 | 24.16-24.92 |
| Y (turkey) | 59 | 89 | 28 |
| Z (turkey) | 55 | 11 | 29.5 |

Samples Z had a lower L value and were slightly darker than Samples Y, indicating that there was transfer of color to these samples. The color absorbed by the hams of Samples U and W were similar to each other.

As the amount of peeling aid increases, as shown here from 0 to 1 wt. %, the level of delamination decreases. It has been found, delamination is almost 100% eliminated when the peeling aid level is increased to approximately 12 wt. % of the liquid smoke solution, depending on the type of meat processed.

Example 3. Delamination and Color Transference #2

A liquid smoke solution similar to Sample Z in Table 1 was made, the differences being that a peeling aid was used at 10.0 wt. % and water at 8.4 wt. %. This solution was used to make the inventive film. This film was run on the Poly-Clip TSC A-200, and two hundred chubs made of turkey emulsion were made as described above. The samples were tested for delamination and color transference. It was observed that the chubs peeled with little to no meat adherence to the casings, and that the color of the chubs was observed to be similar and a towards a yellow color when compared to a control.

Example 4. Delamination and Color Transference #3

A liquid smoke solution similar to Sample Z in Table 1 was made, the differences being that a peeling aid was used at 12.0 wt. % and water at 6.7 wt. %. This solution was used to make the inventive film, which included a blue tint in one of the thermoplastic layers. This film was run on the Poly-Clip TSA-A-200, and both ham and turkey chubs were made as described above. The casings stuffed well at stuffing and during cooking. The samples were tested for delamination and color transference. It was observed that the chubs peeled with little to no meat adherence to the casings, and the blue colored layer of the casing assisted in identifying any casing left on the chubs. The color of the chubs was tested on the L, a, b scale as:

TABLE 3

Color L, a, b Values

| Samples (meat) | L (Average) | a (Average) | b (Averages) |
|---|---|---|---|
| Ham | 56.08 | 12.88 | 22.96 |
| Turkey | 61.43 | 9.89 | 31.86 |

Example 5. Delamination #4

Another liquid smoke solution similar to Sample Z in Table 1 was made, the difference being that 10.0 wt. % of a peeling aid was used. This solution was used to make the inventive film. This film was run on the Poly-Clip TSA-A-200, and turkey chubs were made as described above. The casings stuffed well at stuffing and during cooking. Although two production lines were run, problems with the machinery came up with one line. The second production line ran well, and a 95% peeling rate was seen.

Example 6. Caramel Containing Casings

A caramel solution was made containing 50 wt. % caramel, 7.5 wt. % of surfactant, 30.5 wt. % of propylene glycol, and 12 wt. % peeling wax. This solution was applied to the inventive casing as described above. It was used on the Poly-Clip TSC A-200 stuffing machine, and the formed casing was stuffed with turkey emulsion and processed. The chubs were very cold when peeled, with a surface temperature of 26.1° F. and an internal temperature of 25.2 to 25.6° F., with ice being seen on the outside of the chubs as well as on the surface of the meat. Sixty-four chubs were made and peeled, with forty-four peeling at 100%, seventeen did not peel fully, and three chubs being stopped by the machine operator due to machine problems. It is believed that the temperature at peeling affects the peeling performance of the inventive casing.

All patents cited above are hereby incorporated by reference.

The above examples are illustrative only, and should not be interpreted as limiting since further modifications of the disclosed embodiments will be apparent to those skilled in the art in view of this teaching. All such modifications are deemed to be within the scope of the invention disclosed herein. It is intended that the scope of the invention be defined by the claims appended hereto, and their equivalents

I claim:
1. A multilayered film, comprising:
 a first outer absorbent layer, comprising:
  absorptive material selected from the group consisting of: polyethylene terephthalate (PET) paper; cellulose and polyester blend paper; papers made from non-cellulosic materials; and pressed, matted, or felted fibrous papers; and
  a solution absorbed within the absorptive material, the solution comprising a peeling aid and a selection from the group consisting of a coloring solution, a flavoring solution, and a coloring and flavoring solution;
 a second inner thermoplastic layer comprising an oxygen barrier; and
 a third outer thermoplastic layer comprising a moisture barrier and abuse resistant layer,
 the Kinetic Coefficient of Friction of the third outer thermoplastic layer to metal being a maximum of 0.425,
 the Kinetic Coefficient of Friction of the first outer absorbent layer to metal being a maximum of 0.400,
 the Kinetic Coefficient of Friction of the first outer absorbent layer to the third outer thermoplastic layer being a maximum of 0.425,
 the multilayered film being a flat film, and
 the multilayered film being a dry film with a finished moisture level from 2.0 wt. % to 5.0 wt. % of the multilayered film.
2. The multilayered film of claim 1, wherein the absorptive material of the first outer absorbent layer comprises the cellulose and polyester blend paper or the polyethylene terephthalate (PET) paper.

3. The multilayered film of claim 1, wherein the second inner thermoplastic layer comprises a thermoplastic selected from the group consisting of ethylene vinyl alcohol, polyvinylidene chloride, nylon 6, nylon 6/12 copolymer, and nylon 6/66 copolymer.

4. The multilayered film of claim 3, wherein the second inner thermoplastic layer comprises the nylon 6.

5. The multilayered film of claim 1, wherein the third outer thermoplastic layer comprises a thermoplastic selected from the group consisting of polyethylene, low density polyethylene, linear low density polyethylene, and blends of low density polyethylene and linear low density polyethylene.

6. The multilayered film of claim 5, wherein the third outer thermoplastic layer comprises the low density polyethylene.

7. The multilayered film of claim 5, wherein the third outer thermoplastic layer comprises the linear low density polyethylene.

8. The multilayered film of claim 5, wherein the third outer thermoplastic layer comprises a blend of the low density polyethylene and the linear low density polyethylene.

9. The multilayered film of claim 1, wherein the group consisting of the coloring solution, the flavoring solution, and the coloring and flavoring solution consists of liquid smoke solution, caramel solution, and a blend of liquid smoke and caramel solutions.

10. The multilayered film of claim 9, wherein the solution comprises the peeling aid, liquid smoke, and water, the solution having a pH of from about 4 to about 14.

11. The multilayered film of claim 9, wherein the solution comprises the peeling aid, caramel, and water, the solution having a pH of from about 2 to about 10.

12. A multilayered film, comprising:
a first outer absorbent layer comprising:
absorptive material selected from the group consisting of polyethylene terephthalate (PET) paper; cellulose and polyester blend paper; papers made from non-cellulosic materials; and pressed, matted, or felted fibrous papers; and
a solution absorbed within the absorptive material, the solution comprising a peeling aid and a selection from the group consisting of a coloring solution, a flavoring solution, and a coloring and flavoring solution;
a second inner adhesive layer;
a third inner thermoplastic layer comprising an oxygen barrier;
a fourth inner adhesive layer; and
a fifth outer thermoplastic comprising a moisture barrier and abuse-resistant layer;
the Kinetic Coefficient of Friction of the fifth outer thermoplastic layer to metal being a maximum of 0.425,
the Kinetic Coefficient of Friction of the first outer absorbent layer to metal being a maximum of 0.400,
the Kinetic Coefficient of Friction of the first outer absorbent layer to the fifth outer thermoplastic layer being a maximum of 0.425,
the multilayered film being a flat film, and
the multilayered film being a dry film with a finished moisture level from 2.0 wt. % to 5.0 wt. % of the multilayered film.

13. The multilayered film of claim 12, wherein the first outer absorbent layer comprises:
the cellulose and polyester blend paper; or
the polyethylene terephthalate (PET) paper.

14. The multilayered film of claim 12, wherein the third inner thermoplastic layer comprises a thermoplastic selected from the group consisting of ethylene vinyl alcohol, polyvinylidene chloride, nylon 6, nylon 6/12 copolymer, and nylon 6/66 copolymer.

15. The multilayered film of claim 14, wherein the third inner thermoplastic layer comprises the nylon 6.

16. The multilayered film of claim 12, wherein the fifth outer thermoplastic layer comprises a thermoplastic selected from the group consisting of polyethylene, low density polyethylene, linear low density polyethylene, and blends of low density polyethylene and linear low density polyethylene.

17. The multilayered film of claim 16, wherein the fifth outer thermoplastic layer comprises the low density polyethylene.

18. The multilayered film of claim 16, wherein the fifth outer thermoplastic layer comprises the linear low density polyethylene.

19. The multilayered film of claim 16, wherein the fifth outer thermoplastic layer comprises a blend of the low density polyethylene and the linear low density polyethylene.

20. The multilayered film of claim 12, wherein an adhesive of the second inner adhesive layer is the same as an adhesive of the fourth inner adhesive layer.

21. The multilayered film of claim 12, wherein an adhesive of the second inner adhesive layer is different than an adhesive of the fourth inner adhesive layer.

22. The multilayered film of claim 12, wherein an adhesive of the second inner adhesive layer and of the fourth adhesive layer is a polyurethane-based adhesive.

23. The multilayered film of claim 12, wherein the group consisting of the coloring solution, the flavoring solution, and the coloring and flavoring solution consists of liquid smoke solution, caramel solution, and a blend of liquid smoke and caramel solutions.

24. The multilayered film of claim 23, wherein the solution comprises the peeling aid, liquid smoke, and water, the solution having a pH of from about 4 to about 14.

25. The multilayered film of claim 23, wherein the solution comprises the peeling aid, caramel, and water, the solution having a pH of from about 2 to about 10.

26. The multilayered film of claim 12, wherein the peeling aid is selected from the group consisting of waxes.

* * * * *